United States Patent
Anderson, II

(10) Patent No.: US 7,209,043 B2
(45) Date of Patent: Apr. 24, 2007

(54) SENSING SYSTEM FOR PET CONTROLLABLE ACCESS

(76) Inventor: James Austin Anderson, II, 2931 Balmoral Rd., Birmingham, AL (US) 35223

(*) Notice: Subject to any disclaimer, the term of this patent is extended or adjusted under 35 U.S.C. 154(b) by 152 days.

(21) Appl. No.: 10/984,240

(22) Filed: Nov. 9, 2004

(65) Prior Publication Data

US 2005/0133701 A1    Jun. 23, 2005

Related U.S. Application Data

(60) Provisional application No. 60/529,308, filed on Dec. 15, 2003.

(51) Int. Cl.
*G08B 23/00* (2006.01)
(52) U.S. Cl. .............. 340/573.3; 119/53; 119/61.5; 119/858; 119/859
(58) Field of Classification Search ............. 340/573.3; 119/53, 61.5, 858, 859
See application file for complete search history.

(56) References Cited

U.S. PATENT DOCUMENTS

| | | | | |
|---|---|---|---|---|
| 6,145,473 A | * | 11/2000 | Keisner | 119/53 |
| 6,349,671 B1 | * | 2/2002 | Lewis et al. | 119/51.02 |
| 2004/0100386 A1 | * | 5/2004 | Tendler | 340/573.3 |
| 2005/0252622 A1 | * | 11/2005 | Reid | 160/180 |

FOREIGN PATENT DOCUMENTS

JP            10136819 A    *   5/1998

* cited by examiner

*Primary Examiner*—Jeffery Hofsass
*Assistant Examiner*—Samuel J. Walk

(57) ABSTRACT

Pet sensing is accomplished by detecting pulsed infrared light reflected from a pet worn collar or harness devised of highly reflective material. To avoid false triggering, a dual set of infrared light emitting and detecting sensor units works in conjunction with logic circuitry for reliable activation of an electrically actuated access device.

2 Claims, 2 Drawing Sheets

SENSING SYSTEM FOR PET CONTROLLABLE ACCESS

This appln claims benefit of 60/529,308 Dec. 15, 2003.

BACKGROUND

1. Field of Invention

The background of this invention relates to systems for controlling animal access and, more particularly, for systems providing pet controllable access to food or shelter. In this description the terms "pet" and "animal" may be used interchangeably and generally refer to dogs and cats although other animals having similar features of size and shape may benefit.

2. Description of Prior Art

Many pets enjoy or need a certain amount of time outside the home for recreation or to answer nature's call, but most pet owners feed their animals inside the home to insure that other animals do not have access to the pet's food. In particular, foraging raccoons and opossums are becoming major problems in residential areas where they search for any available food source. Controlling access to the residence or to a feeding device is a desirable solution. In some situations there are pets that prefer to live outside and are fed on a routine by their owner, either inside or out, but at a time or in a manner that avoids conflict with stray pets and other animals. In such instances when the owner will be absent for several days, it is desirable for the pet to be able to "self control" its access to the food source. In prior art, the solution is to employ some means of proximate detection through magnets, transponders or transmitters carried or worn by the pet on a collar or harness. Such techniques present certain problems of complexity, expense, and possible pet discomfort that the present invention overcomes.

In U.S. Pat. No. 4,036,178 to Lee, et al., an electronic lock and key system is described in which a passive transponder in the form of a CMOS chip is worn on the pet or embedded subcutaneously. Such a technique is also used in pet identification systems and are known in the broader art as Radio Frequency Identification (RFID) systems. An advantage of such a system is that it can allow discrimination between several animals wearing uniquely encoded transponders. However such a system is relatively complex and expensive and somewhat restrictive due to limited range for sensing the transponder's responsive signal. In a pet access system this limited range dictates a restrictive aperture size for the portal or passageway through which the animal must pass to be close enough for sensing by the reader. A similar approach is found in U.S. Pat. No. 5,992,096 to De La Cerda, et al, which includes a motion detector that works in conjunction with an encoded pet tag. Using transponders for animal sensing is also a feature of U.S. Pat. No. 6,297,739 to Small and U.S. Pat. No. 6,349,671 to Lewis, et al., wherein the latter is for control of a feeding system. In U.S. Pat. No. 5,669,328 to Lanfranchi an active transmitter is worn on the pet's collar. This overcomes, somewhat, the sensing limitations of the previously cited patents but introduces the need for a battery to power the transmitter with the possibility of failure from battery depletion.

Other approaches include magnets worn on a collar such as described in U.S. Pat. No. 5,701,702 to Reid, et al., and in U.S. Pat. No. 6,453,847 to Brooks; and an ultrasonic transponder described in U.S. Pat. No. 5,872,516 to Bonge, Jr. In these the disadvantage of a bulky or heavy object attached to the collar is apparent and, in the case of Bong, Jr., the possibility of discomfort to the pet exists due to the ability of most pets to hear ultrasonic frequencies.

In the above referenced patents there are disclosures of various ways to effect the physical blocking or unblocking of passage or access to food through electrically or magnetically actuated locks, motor driven doors, etc. Although each has its own merit, it will be seen that an object of the present invention is that it be adaptable to any preferred electrically actuated access device.

OBJECTS AND ADVANTAGES

The forgoing discussion relates various disadvantages that are overcome in the present invention through the following objects and advantages:

1) No bulky or heavy pet carried device is required. In the present invention a reflective collar or harness of conventional design is used without any additional components that would interfere with the pet's comfort.
2) No battery powered pet carried device is required. Any active device worn on a pet is subject to battery depletion. A reflective collar or harness is passive, needing no battery.
3) The design can be implemented with minimal "off-the-shelf" electronic components for simplicity and economy. A prototype of this invention has been constructed in which all active electronic components were purchased from an electronic hobby store.
4) Proximate sensing distance needs to be adequate to allow convenient sizing of the aperture of the portal through which the pet traverses. The present invention relies upon the nature of reflected light, thus the portal can be constructed to any practicable size depending on the intensity of illumination of the collar.
5) The system is adaptable to interface with existing or future electrically operated access doors and feeding devices. In the preferred embodiment the system provides a standard logic level output signal which is easily modified through voltage shifting or current driving amplifiers to interface with many types of electrically actuated devices.

Further objects and advantages of the invention will be apparent from a consideration of the drawings and ensuing description.

DRAWING FIGURES

GENERAL DESCRIPTION

Pet proximity sensing is the key to a pet controllable access system. In the present invention, pet sensing is accomplished by detecting pulsed infrared light reflected from a pet worn collar or harness devised of highly reflective material, such collars and harnesses being commercially available and sold as protective devices to alert oncoming cars or to locate a stray animal. To avoid false triggering, a dual set of infrared light emitting and detecting sensor units works in conjunction with logic circuitry for reliable activation of an electrically actuated access device.

Structure

Figure 1A:
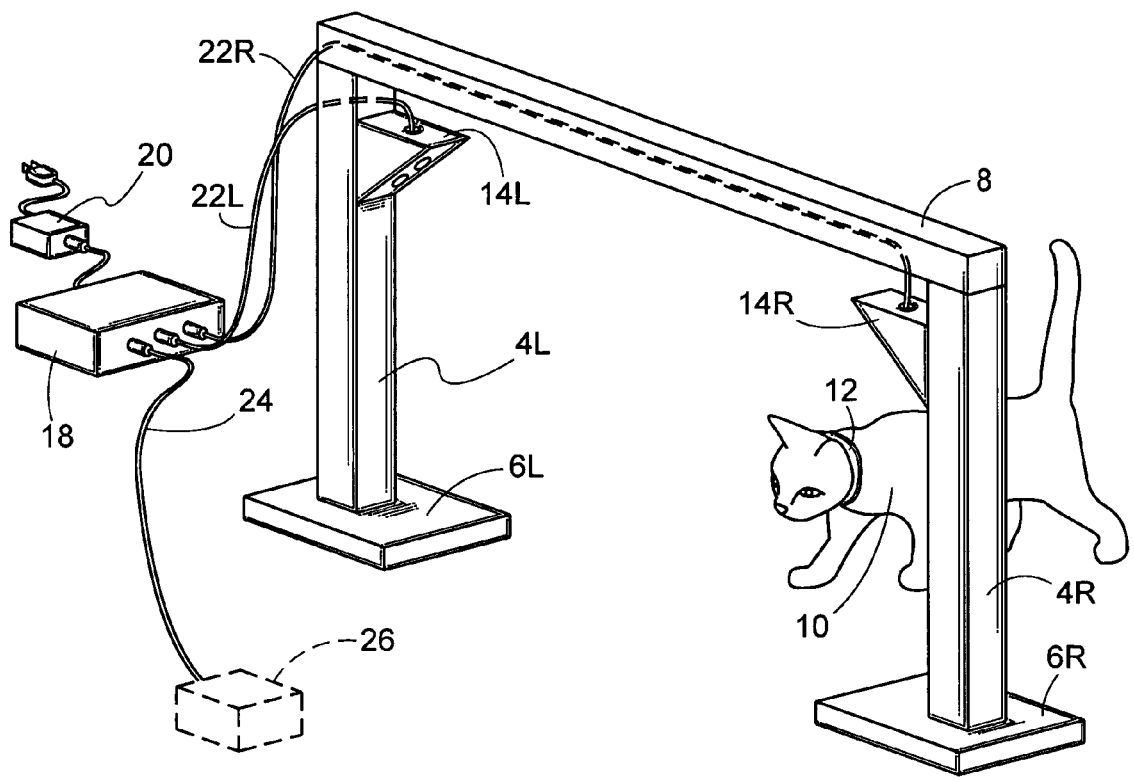
FIG. 1A is a perspective view relating the various components of the invention to a typical pet entering a portal for access.
Figure 1B:
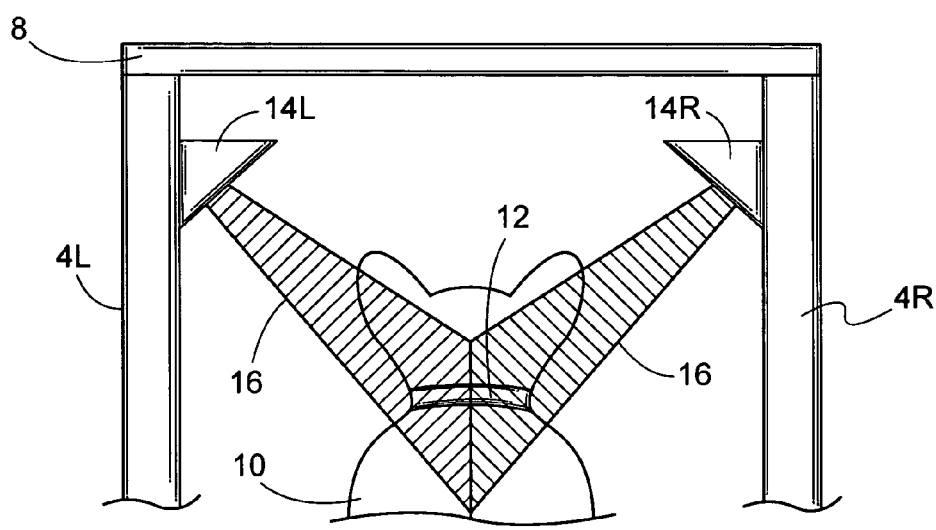
FIG. 1B is a frontal view of the portal showing more clearly the relation ship between a pet, its collar and the elements of a portal.

Referring to FIGS. 1A and 1B, a portal is defined by left and right vertical supporting members 4L and 4R The portal, placed on the ground or floor surface, may be free standing and stabilized by supporting feet 6L and 6R with horizontal cross member 8 for additional stability. Optionally the portal could be formed from the side members of an opening in a door or wall of an enclosure to which selected pet access is desirable. A pet 10 wearing reflective collar 12 is shown approaching the portal. On each vertical member 4L and 4R is attached infrared emitting and sensor unit 14L and 14R positioned at a height above ground or floor level as to permit aiming in and down at an angle toward the center of the portal creating an illumination of the area 16. The illumination impinges on the upper sides of reflective collar 12 such that the infrared light reflected from collar 12 is visible to sensor units 14L and 14R. Reflective collar 12 can be one of many commercially available models, such collars being manufactured for dogs and cats by Aspen Pet Products, Inc., Denver, Colo., and by Scott Pet Products, Rockville, Ind. among others. It should be noted that the eyes of pets are highly reflective. The use of two sensor units aimed from opposing directions in conjunction with the control unit circuitry precludes false triggering of the system by an animal that peers directly into either sensor. Integral to the system is control unit 18 placed in proximity to the portal or in an accessible compartment of either supporting foot 6L or 6R. A d.c. power source 20 is provided of standard design operable from an a.c. outlet and optionally incorporating a rechargeable battery for continuous operation during a power failure. Connecting cables 22L and 22R convey signals between identical sensor units 14L and 14R and control unit 18. Connecting cable 24 conveys an actuating signal to access device 26 which is may be an electrically operated door or feeding mechanism. Although shown here in outline form, the access device is not part of the invention and is therefore not illustrated in detail.

Figure 2:
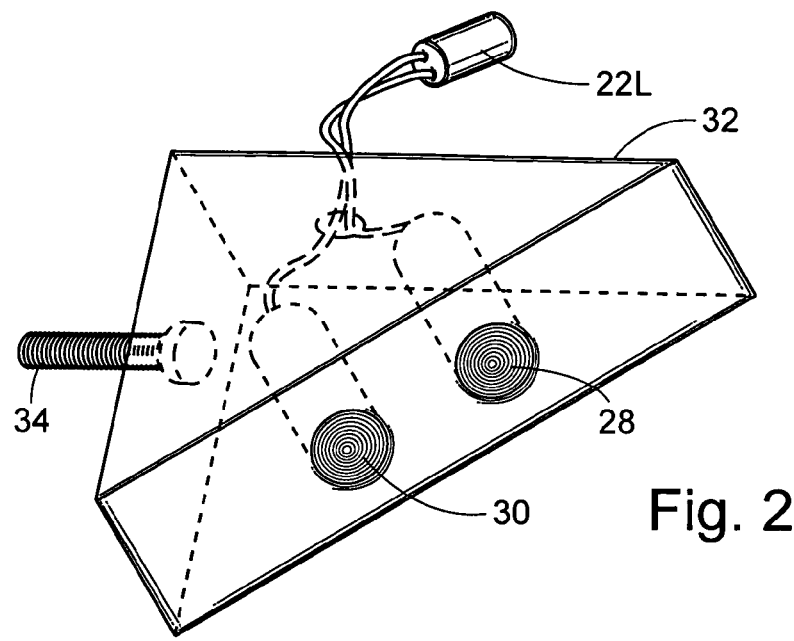
FIG. 2 is detail of a preferred embodiment of a light emitting and detecting sensor.

FIG. 2 shows in more detail left sensor unit 14L comprising an infrared light emitting diode 28 hereinafter referred to as IR LED, and infrared photodetector 30, hereinafter referred to as IR detector. IR detector 30 may be optionally covered by a deep red filter of plastic or glass to reduce sensitivity to ambient visible light. IR LED 28 and IR detector 30 are mounted in an enclosure 32 in close proximity to each other to optimize the detection of reflected light from collar 12 while isolating IR detector 30 from direct light of IR LED 28. Optionally there may be a plurality of IR LEDs formed in a cluster to increase the illumination intensity and thus increase the effective area of sensing 16 for pets of larger size. Sensors 14L and 14R are each attached to vertical supports 8L and 8R respectively with standard machine screw 34 but could be attached in alternative ways to permit easy repositioning of sensors 14L and 14R for optimal height. Additionally, the lateral distance between sensors may also be made adjustable so that portal dimensions can accommodate pets of different sizes.

Operation

Figure 3:
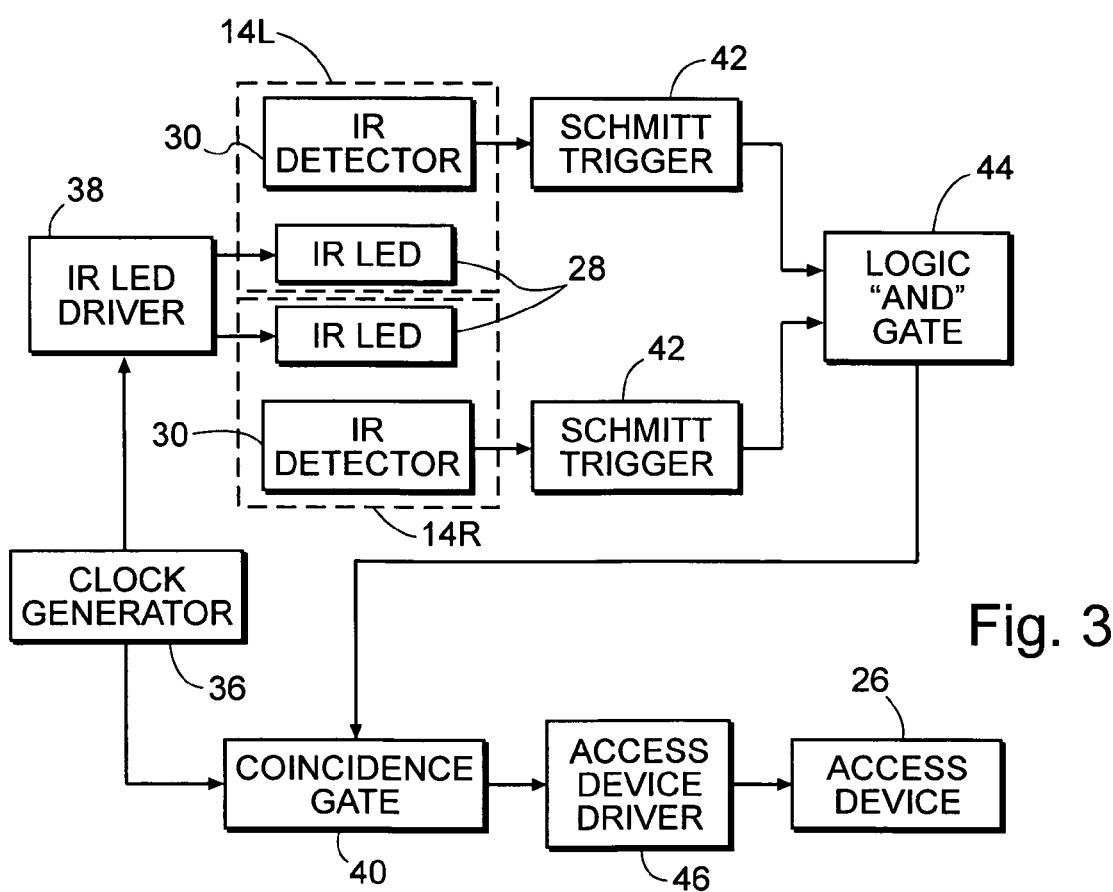
FIG. 3 is a block diagram showing flow of signals and logic of a control unit.

FIG. 3 shows in block diagram the operation of the system. Optimally, elements 36, 38, 40, 42, 44 and 46 comprise control unit 12 of FIG. 1A. Clock generator 36 provides a square wave signal that is amplified by driver 38 to pulse IR LED emitter 28 of each sensor unit on and off at a certain rate. A rate of 100 hertz is practical but not critical to the logic of the system. Clock generator 36 also provides a logic level signal of corresponding frequency and phase to one input of coincidence gate 40. Infrared light pulses emitted from each sensor are reflected by collar 12 and create pulsed current flow in IR detector 30 of sensors 14L and 14R. The resulting pulses are reshaped by Schmitt trigger 42. Logic AND gate 44 remains in the off or low state until both sensors provide virtually identical in-phase signals at which time the output of AND gate 44 will be a replica of the clock signal in phase and frequency. A coincidence gate 40 is provided which may preferably be a logic XOR gate with suitable R/C integrator, such circuit not shown in detail as it is common in the art. When the output of AND gate 44 is low (no collar detected) coincidence gate 40 output is also low since its inputs do not match. When the output of AND gate 44 is in phase with the clock signal (a collar is present) the output of coincidence gate 40 goes high to its on state. The integrating time constant of coincident gate 40 is set in accordance with the clock rate to avoid false triggering from short light spikes but with adequate response to the normal time a pet is expected to be present in the portal. The output of coincidence gate 40 can be additionally processed by access device driver 46 to provide appropriate voltage and current levels for actuating access device 26.

SUMMARY

It can be seen that the objects and advantages of the present invention are met by utilizing readily available protective collars in conjunction with inexpensive infrared emitting and detecting components and logic circuitry to provide a novel way to sense pets for access control. The design and physical construction of the portal through which an "authorized" pet traverses is flexible requiring only changes in the pulsed infrared illuminating intensity within the portal and dimensions of the portal itself. This invention provides the core technology for developing an inexpensive array of finished pet access products that can be tailored for use in a home, a back yard, or even on a farm for access control of larger animals such as a sheep, goat or horse. This invention further insures that pet access systems can be built wherein the sensing does not affect the pet's comfort. Additional utility may be provided by microprocessor interfacing to allow time of day access, counting of access events, and the control of audible and visual devices which might be used for an aid in pet training and owner alert signaling.

Although the drawings and description herein represent a preferred embodiment, it should be obvious to one skilled in the art that omissions, corrections and additions can be made which would not conflict with the spirit and essence of the invention.

I claim:

1. An improved pet sensing system for detecting the presence of a pet comprising
   (a) a dual set of IR light sources light sources and photo sensors positioned at opposing angles
   (b) an infrared photo-sensing means
   (c) a circuitry means
   (d) a collar or harness of reflective material worn by said pet wherein light from said IR light sources is reflected by said collar or harness worn by said pet and detected by said photo-sensing means and subsequently processed by said circuitry means to provide a signal for activating the controlling circuitry of an electrically operable means of access to food or shelter.

2. An improved pet sensing system of claim 1 wherein the dual set of light sources is pulse modulated and the circuitry means demodulates said pulsed reflected light so as to discriminate between the reflected light originating from the IR light sources from ambient reflected light.

* * * * *